(12) United States Patent
Keller et al.

(10) Patent No.: US 12,421,892 B2
(45) Date of Patent: Sep. 23, 2025

(54) HYBRID TURBINE ENGINE WITH SELECTIVE ELECTRICAL MODULE ENGAGEMENT

(71) Applicant: Rolls-Royce North American Technologies Inc., Indianapolis, IN (US)

(72) Inventors: Richard Keller, Indianapolis, IN (US); Dwayne Bevis, Bloomington, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 1448 days.

(21) Appl. No.: 16/703,376

(22) Filed: Dec. 4, 2019

(65) Prior Publication Data

US 2021/0171212 A1    Jun. 10, 2021

(51) Int. Cl.
*F02C 3/10*    (2006.01)
*B64D 27/10*    (2006.01)
*B64D 27/33*    (2024.01)
*B64D 31/06*    (2006.01)
*B64D 31/18*    (2024.01)
*B64D 27/02*    (2006.01)
*F01D 15/10*    (2006.01)

(52) U.S. Cl.
CPC ............... *F02C 3/10* (2013.01); *B64D 27/10* (2013.01); *B64D 27/33* (2024.01); *B64D 31/06* (2013.01); *B64D 31/18* (2024.01); *B64D 27/026* (2024.01); *F01D 15/10* (2013.01); *F05D 2220/323* (2013.01); *F05D 2260/607* (2013.01)

(58) Field of Classification Search
CPC ...... F02C 6/14; F01D 15/10; B64D 2027/026
See application file for complete search history.

(56) References Cited

U.S. PATENT DOCUMENTS

| | | |
|---|---|---|
| 7,212,148 B1 | 5/2007 | Torres |
| 7,370,836 B2 | 5/2008 | Greene |
| 7,926,287 B2 | 4/2011 | Ullyott et al. |
| 8,109,073 B2 | 2/2012 | Foster et al. |
| 8,549,833 B2 | 10/2013 | Hyde et al. |
| 8,552,575 B2 | 10/2013 | Teets et al. |
| 9,764,848 B1 | 9/2017 | Vondrell et al. |
| 10,137,981 B2 | 11/2018 | Miller et al. |
| 10,196,923 B2 | 2/2019 | Thomassin |
| 10,233,768 B1 * | 3/2019 | Watts, III ................ F01D 15/10 |
| 10,309,304 B2 | 6/2019 | Bourne et al. |
| 2010/0108806 A1 | 5/2010 | Chan et al. |
| 2010/0126178 A1 | 5/2010 | Hyde et al. |
| 2010/0327109 A1 | 12/2010 | Dooley et al. |

(Continued)

*Primary Examiner* — Gerald L Sung
*Assistant Examiner* — Jacek Lisowski
(74) *Attorney, Agent, or Firm* — Barnes & Thornburg (57) ABSTRACT

A hybrid propulsion system for an aircraft includes a gas turbine engine, an energy storage device, at least one propulsor configured to use energy provided by one or both of the gas turbine engine and the energy storage device to provide thrust. The system also includes a controller configured to vary the power provided to the propulsor(s) in response to a signal. The signal may be provided manually by a user of the system or automatically. Automatic signals may be indicative of a threat to the aircraft, geographical location of the aircraft, altitude of the aircraft, or ingestion of particles into the gas turbine engine.

16 Claims, 8 Drawing Sheets

(56) References Cited

U.S. PATENT DOCUMENTS

| | | | |
|---|---|---|---|
| 2015/0159552 A1* | 6/2015 | Rodriguez | F02C 6/18 |
| | | | 290/2 |
| 2016/0236790 A1* | 8/2016 | Knapp | G08G 5/0021 |
| 2017/0089261 A1* | 3/2017 | Bourne | F02C 6/14 |
| 2018/0051701 A1 | 2/2018 | Kupiszewski et al. | |
| 2018/0229851 A1* | 8/2018 | Joshi | F02C 9/16 |
| 2018/0306112 A1* | 10/2018 | Kippel | F02C 7/042 |
| 2018/0319509 A1* | 11/2018 | Miosi | B64D 45/00 |

* cited by examiner

HYBRID TURBINE ENGINE WITH SELECTIVE ELECTRICAL MODULE ENGAGEMENT

FIELD OF THE DISCLOSURE

The present disclosure relates generally to propulsion systems, and more specifically to hybrid propulsions systems including a gas turbine engine and one or more propulsors that may be powered by one or more of the gas turbine engine and a battery.

BACKGROUND

Gas turbine engines are used to power aircraft, watercraft, power generators, and the like. Gas turbine engines typically include a core including a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

The compressor, combustor, and/or turbine of a gas turbine engine may generate heat and noise as a consequence of their normal operation. Heat and noise generated by a gas turbine engine may present a threat to an aircraft powered by the gas turbine engine. For example, anti-aircraft missiles often are configured to train on exhaust heat from a gas turbine engine. Also, noise generated by a gas turbine engine may alert enemy combatants to the presence of an aircraft powered by the gas turbine engine.

Further, noise from aircraft powered by a gas turbine engine may disturb persons in the vicinity of airports and other areas where the aircraft might fly at lower altitudes, especially during full power maneuvers such as take-off.

Moreover, a gas turbine engine may ingest a large mass of air from atmosphere into the core to support operation of the core. Particles, for example, sand particles, may be entrained in the air and drawn into the core therewith during normal operation, especially in an application where the gas turbine engine is used as a propulsor or power source for a propulsor of an aircraft. Such particles may cause impact damage to elements of the core. Also, such particles may glassify within the core and thereby become adhered to components of the core due to the high temperatures the particles might be exposed to with the core.

SUMMARY

The present disclosure may comprise one or more of the following features and combinations thereof.

A hybrid propulsion system for use with an aircraft may include a gas turbine engine core, an electric power system, at least one propulsor, and a controller. The gas turbine engine core includes a compressor, a combustor, and a turbine. The electric power system may include an energy storage device, a generator connected with the energy storage device, and a motor connected with the energy storage device. The motor is configured to produce rotational energy in response to receiving electric energy from the energy storage device.

The at least one propulsor is configured to use energy received from at least one of the gas turbine engine core and the electric power system to generate thrust for propelling the aircraft. The controller is configured to control provision of power from the engine core and the electric power system to the at least one propulsor to cause the at least one propulsor to generate thrust having a force magnitude value and to adjust the provision of power from the engine core and the electric power system in response to the controller receiving a signal so that the at least one propulsor continues to generate thrust having the force magnitude value.

In some embodiments, the controller may control the provision of energy by varying at least one of a rotational speed of the engine core and a fuel flow into the engine core while simultaneously varying the provision of power from the electric power system to the at least one propulsor.

In some embodiments, the signal may be generated in response to a manual input provided by a user of the hybrid propulsion system. In some embodiments, the signal may be generated in response to the controller detecting a threat to the aircraft.

In some embodiments, the system may include a particle sensor connected with the controller and located at an inlet of the gas turbine engine core. The signal may be generated in response to the sensor detecting a number of particles suspended in air entering the inlet being greater than a predetermined threshold value.

In some embodiments, the controller may reduce the rotational speed of the gas turbine engine core in response to receiving the signal to cause the number of particles entering the gas turbine engine core to be reduced. In some embodiments, the controller may reduce the fuel flow into the gas turbine engine core in response to receiving the signal to reduce a temperature of gases in the gas turbine engine core to lower the number of particles being glassified in the gas turbine engine core.

In some embodiments, the controller may be configured to limit at least one of a rotational speed of the gas turbine engine core and a fuel flow into the gas turbine engine core during take-off of the aircraft. The controller may be configured to increase the at least one of a rotational speed of the gas turbine engine core and fuel flow into the gas turbine engine core during at least one of climb and cruise of the aircraft to reduce a number of particles suspended in airflow entering the gas turbine engine core during take-off.

In some embodiments, the signal may be generated in response to a noise level generated by the hybrid propulsion system being above a predetermined noise threshold. In some embodiments, the signal may be generated in response to an altitude of the aircraft being less than a predetermined altitude limit.

In some embodiments, the controller may be configured to detect a geographical location of the aircraft. The signal may be generated in response to the geographical location of the aircraft the hybrid propulsion system being within a preset zone. In some embodiments, the preset zone may be associated with a predetermined airport location.

In some embodiments, the controller may be configured to reduce a rotational speed of the gas turbine engine core to reduce noise generated by the hybrid propulsion system in response to receiving the signal. In some embodiments, the controller may be configured to reduce fuel flow to the gas turbine engine core to reduce an amount of heat generated by the hybrid propulsion system in response to receiving the signal.

In some embodiments, the hybrid propulsion system may include a sensor connected with the controller. The sensor may be configured to detect an exhaust temperature of the gas turbine engine core. The controller may be configured to generate the signal based on data received from the sensor to control a power output of the gas turbine engine core to maintain the exhaust temperature at or below a predetermined level.

In some embodiments, the at least one propulsor may include at least one of a turbofan coupled directly with the gas turbine engine core, a fan located remote from the gas turbine engine core, and a propeller. In some embodiments, the electric power system may be coupled with the gas turbine engine core. The electric power system may be configured to rotate the gas turbine engine core to provide power to the at least one propulsor via the gas turbine engine core.

According to another aspect of the present disclosure, a method of operating a hybrid propulsion system may comprise a number of steps. The method may include providing a gas turbine engine core including a compressor, a combustor, and a turbine; providing an energy storage device; providing at least one propulsor configured to use energy received from at least one of the gas turbine energy and the energy storage device to generate thrust for propelling an aircraft; and varying a provision of power between the gas turbine engine core and the energy storage device to the propulsion system in response to a signal so that the at least one propulsor achieves a predetermined thrust level.

In some embodiments, the step of varying may comprise varying at least one of a rotational speed of the gas turbine engine core and a fuel flow into the gas turbine engine core. In some embodiments, the signal may be provided by a sensor to a controller and the controller may be configured to perform the step of varying.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1A:
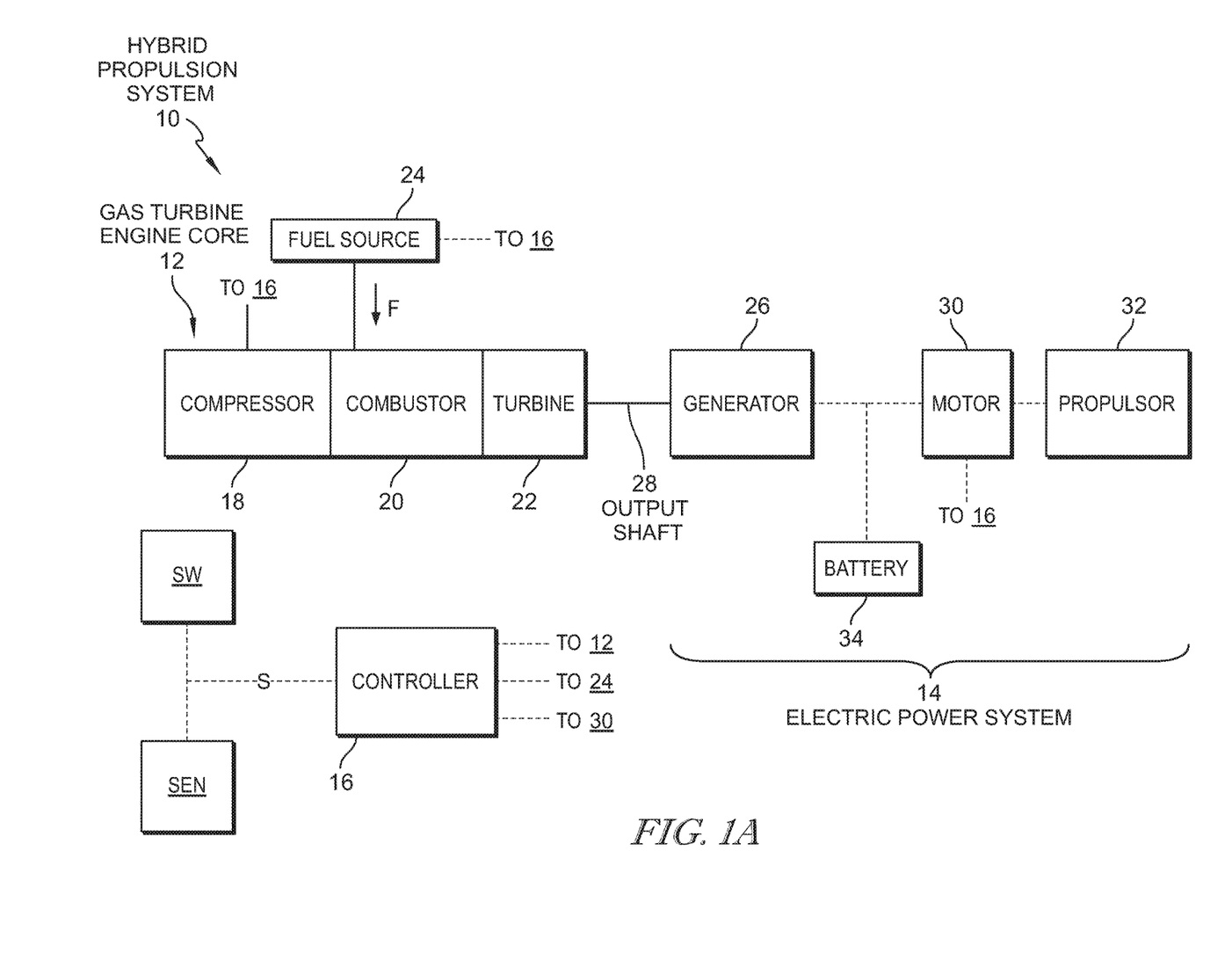
FIG. 1A is a diagrammatic view of a first embodiment of a hybrid propulsion system for use with an aircraft according to the present disclosure, the hybrid propulsion system including a gas turbine engine core; an electric power system having a battery, two motors powering corresponding propulsors, and a generator configured to power the motors and charge the battery; and a controller configured to regulate fuel provided to the gas turbine engine core and electrical energy provided to the motors by the generator and the battery.
Figure 1B:
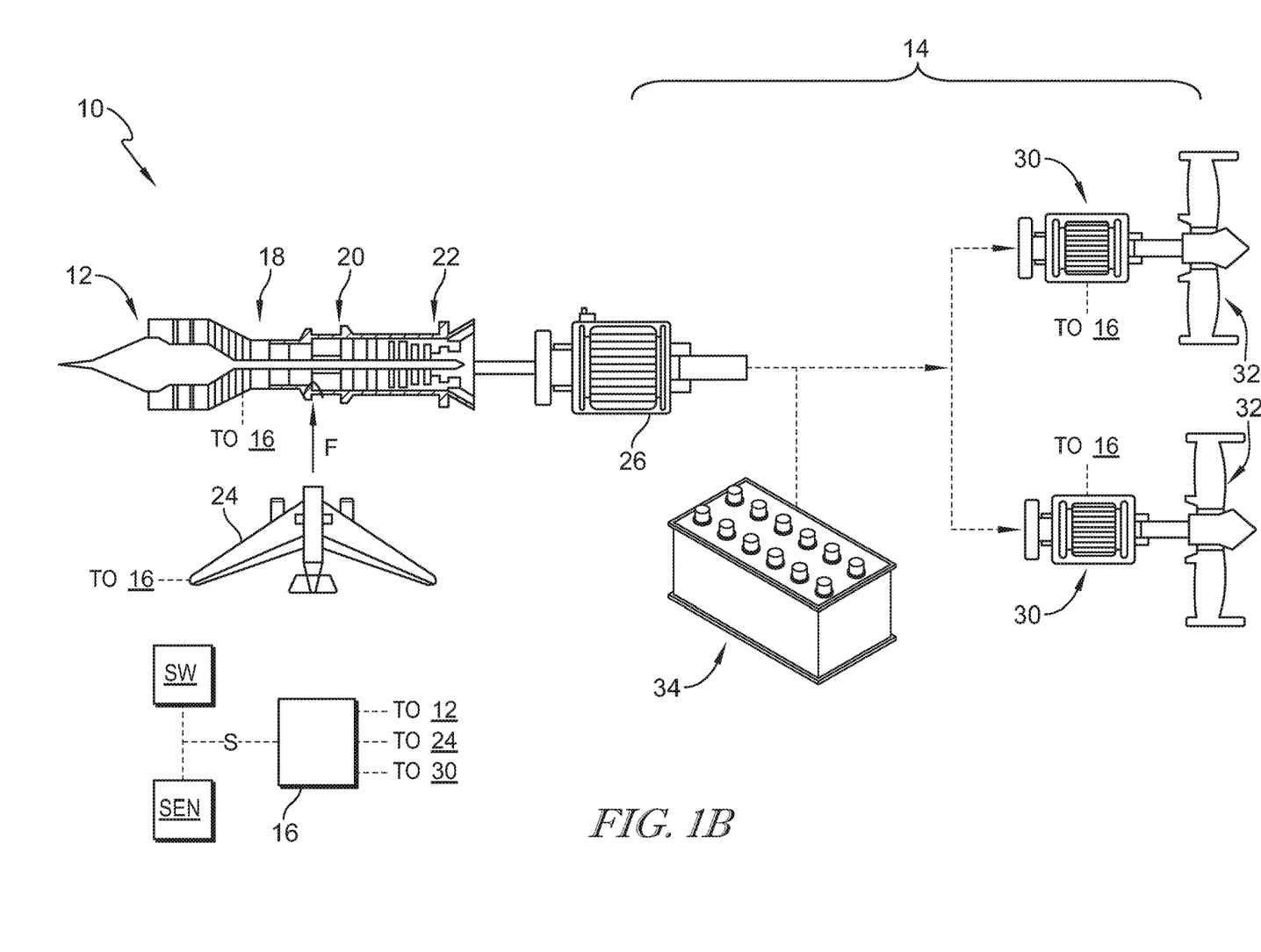
FIG. 1B is a physical illustration view of the hybrid propulsion system of FIG. 1A.

FIGS. 1A and 1B are, respectively, diagrammatic and physical illustration views of a first embodiment of a hybrid propulsion system 10 for use with an aircraft according to the present disclosure. The hybrid propulsion system 10 includes a gas turbine engine core 12, an electric power system 14, and a controller 16. The gas turbine engine core 12 includes a compressor 18, a combustor 20, and a turbine 22. The combustor 20 is configured to receive fuel F from a fuel source 24.

As shown in FIGS. 1A and 1B, the electric power system 14 includes a generator 26 operably connected to the gas turbine engine core 12 by an output shaft 28, an electric motor 30, a propulsor 32 powered by the motor 30, and an energy storage device 34 such as a battery 34. The propulsor 32 may be for example, a fan or a propeller. The generator 26, motor 30, and battery 34 are operably connected to each other. The operable connection between the generator 26, motor 30, and battery 34 allows the generator 26 to selectively provide power to the motor 30 to drive the motor 30 and to selectively provide power to the battery 34 to charge the battery 34. The operable connection between the generator 26, motor 30, and battery 34 also allows the battery 34 to selectively provide power to the motor 30 to drive the motor 30, and to selectively receive power from the generator 26 to charge the battery 34.

As shown in FIG. 1B, the electric power system 14 may further include a second motor 30 and second propulsor 32 powered by the second motor 30. In other embodiments, the electric power system 14 could include more than two motors 30 and propulsors 32 powered by respective ones of the motors 30. References herein to the motor 30 and propulsor 32 powered by the motor 30 should be construed to apply similarly to plural motors 30 and propulsors 32 powered by respective ones of the motors 30 in embodiments having plural motors 30 and propulsors 32 powered by respective ones of the motors 30.

The controller 16 is configured to control the relative amounts of power provided to the motor 30 from the generator 26 and the battery 34 so that the motor 30 provides an amount of torque to the propulsor 32 to achieve a thrust having a desired force magnitude value. The controller 16 may cause a first portion of the power to be provided to the motor 30 by the generator 26 and a second portion of the power provided to the motor 30 to be provided by the battery 34.

The first portion of the power may be any value ranging from 0% to 100% of the power required to achieve the desired force magnitude value, and the second portion of the power may be any complementary value ranging from 100% to 0% of the power required to achieve the desired force magnitude value. As such, the sum of the first portion of the power and the second portion of the power equals 100% of the power required to achieve the desired force magnitude value.

During operation, the hybrid propulsion system 10 provides a first thrust with a first force magnitude value as achieved through a first power split between the gas turbine engine core 12 and the battery 34. (For example, 100% power from the gas turbine engine core 12 and generator 26.) The controller 16 is configured to receive an input to cause the controller 16 to generate instructions to vary the amount of power provided by each of the gas turbine engine core 12 (via generator 26) and the battery 34 as described in detail below to achieve the thrust having the desired force magnitude value. (For example, the controller 16 could vary the split from 100% to 50% power from the gas turbine engine core 12 and from 0% to 50% power from the battery 34.) The desired force magnitude value is greater than the thrust with a force magnitude value that would be achieved if only the power of the gas turbine engine core 12 was reduced, but no additional power from the battery 34 was supplied.

In some embodiments, the desired force magnitude value is about equal to the first force magnitude value of the first thrust such that the thrust does not change in response to the power distribution being varied. In another embodiment, the sum of the first portion of the power and the second portion of the power could be less than or greater than 100% of the power required to achieve the first force magnitude value, so that the actual force magnitude value is less than or greater than the first force magnitude value. In any event, the sum of the first portion of the power and the second portion of the power is greater than the first portion of the power.

The controller 16 is configured to control the relative amounts of power provided to the motor 30 from the generator 26 and the battery 34 in response to a signal S. Based on the signal S (or lack thereof), the controller 16 may vary the relative amounts of power provided to the motor 30 from the generator 26 and the battery 34. For example, the controller 16 may increase the first portion of the power provided to the motor 30 by the generator 26 and simultaneously decrease the second portion of the power provided to the motor 30 by the battery 34. Conversely, the controller 16 may decrease the first portion of the power provided to the motor 30 by the generator 26 and simultaneously increase the second portion of the power provided to the motor 30 by the battery 34.

The controller 16 is configured to vary the flow of fuel F to the combustor 20, thereby varying the power output of the gas turbine engine core 12, the power output of the generator 26, and the amount of power provided to the motor 30 from the generator 26. For example, the controller 16 may increase the flow of fuel F to the combustor 20, thereby increasing the power output of the gas turbine engine core 12, the power output of the generator 26, and the amount of power that may be provided to the motor 30 from the generator 26. Conversely, the controller 16 may decrease the flow of fuel F to the combustor 20, thereby decreasing the power output of the gas turbine engine core 12, the power output of the generator 26 and the amount of power that may be provided to the motor 30 from the generator 26.

The controller 16 is further configured to vary another flow of fuel to the turbine 22 or an afterburner in some embodiments. Discussions of varying the flow of fuel F to the combustor 20 also apply to the controller being able to vary the flow of fuel to other combustion areas of the gas turbine engine core 12 such as the turbine 22 or afterburner.

Alternatively or additionally, the controller 16 is configured to vary the rotational speed of the gas turbine engine core 12, thereby varying the power output of the gas turbine engine core 12, the power output of the generator 26, and the amount of power provided to the motor 30 from the generator 26. For example, the controller 16 may increase the increase the rotational speed of the gas turbine engine core 12, thereby increasing the power output of the gas turbine engine core 12, the power output of the generator 26, and the amount of power that may be provided to the motor 30 from the generator 26. Conversely, the controller 16 may decrease the rotational speed of the gas turbine engine core 12, thereby decreasing the power output of the gas turbine engine core 12, the power output of the generator 26 and the amount of power that may be provided to the motor 30 from the generator 26. Varying the rotational speed of the gas turbine engine core 12 may be achieved with or without varying the flow of fuel and the flow of fuel may be varied with or without varying the rotational speed of the gas turbine engine core 12.

Varying the flow of fuel F to the combustor 20 may cause a corresponding variation in the heat generated by the gas turbine engine core 12 and the exhaust temperature of the gas turbine engine core 12. For example, increasing the flow of fuel F to the combustor 20 may cause the heat generated by the gas turbine engine core 12 and the exhaust temperature of the gas turbine engine core 12 to increase, and decreasing the flow of fuel F to the combustor 20 may cause the heat generated by the gas turbine engine core 12 and the exhaust temperature of the gas turbine engine core 12 to decrease. Varying the flow of fuel F to the combustor 20 may vary the amount of noise generated by the gas turbine engine core 12.

Varying the rotational speed of the gas turbine engine core 12 may cause a variation in the air flow through the gas turbine core 12. For example, increasing the rotational speed of the gas turbine engine core 12 may cause an increase in the air flow through the gas turbine core 12, and decreasing the rotational speed of the gas turbine engine core 12 may cause a decrease in the air flow through the gas turbine core 12. Also, increasing the rotational speed of the gas turbine engine core 12 cause an increase in noise generated by the gas turbine engine core, and decreasing the rotational speed of the gas turbine engine core 12 may cause a decrease in noise generated by the gas turbine core 12.

As mentioned above, the controller 16 is configured to control the relative amounts of power provided to the motor 30 from the generator 26 and the battery 34 in response to a signal S. The signal S may be provided manually by a user of the hybrid propulsion system 10. For example, the user of the hybrid propulsion system 10 may actuate a switch SW or other input device coupled with the controller 16, thereby providing the signal S to the controller 16. Alternatively or additionally, the signal S may be provided automatically by one or more sensors SEN. The signal S provided by such a sensor SEN may be indicative of various items of information, as will be discussed further below.

The controller 16 is configured to respond to the signal S by reducing the first portion of the power provided to the motor 30 by the generator 26 and simultaneously increasing the second portion of the power provided to the motor 30 by the battery 34, or vice versa, to achieve thrust provided by the hybrid propulsion system 10 at the desired force magnitude value, as discussed above in some embodiments. For example, the controller 16 may be configured to respond to the signal S by reducing at least one of the flow of fuel F to the gas turbine engine core 12 and the rotational speed of the gas turbine engine core 12, consequently reducing the first portion of the power provided to the motor 30 by the generator 26 to a level less than that required to achieve the thrust provided by the hybrid propulsion system 10 at the desired force magnitude value. To compensate for the reduction in the first portion of the power provided to the motor 30 by the generator 26, the controller 16 increases the second portion of the power provided to the motor 30 by the battery 34 to achieve the thrust provided by the hybrid propulsion system 10 at the desired force magnitude value.

Similarly, the controller 16 is configured to respond to the absence or clearing of the signal S by increasing at least one of the flow of fuel F to the gas turbine engine core 12 and the rotational speed of the gas turbine engine core 12, consequently increasing the first portion of the power provided to the motor 30 by the generator 26 to a level sufficient to achieve the thrust provided by the hybrid propulsion system 10 at the desired force magnitude value. To compensate for the increase in the first portion of the power provided to the motor 30 by the generator 26, the controller decreases the second portion of the power provided to the motor 30 by the battery 34 to achieve the thrust provided by the hybrid propulsion system 10 at the desired force magnitude value.

The controller 16 may further be configured to increase the power output of the gas turbine engine core 12 and the generator 26 to a level greater than 100% of the power required by the motor 30 to achieve the thrust provided by the hybrid propulsion system 10 at a desired force magnitude value. Any surplus power so provided may be used to charge the battery 34 or to operate another electrical load.

In an embodiment, the signal S provided by the sensor SEN could be indicative of a threat to the aircraft, for example, indicative of an anti-aircraft missile targeting heat generated and exhausted by the gas turbine engine core 12. The controller 16 may be configured to respond to the signal S by decreasing the flow of fuel F to the combustor 20, thereby reducing the exhaust temperature of the gas turbine engine core 12, and thereby mitigating the threat.

As discussed above, the reduction in fuel flow may yield a decrease in power output by the gas turbine engine core 12 and a decrease in the power output of the generator 26. Consequently, the first portion of power provided to the motor 30 by the generator 26 would decrease. In order to achieve the thrust output of the hybrid propulsion system 10 at the desired force magnitude value, the controller 16 would increase the second portion of the power provided to the motor by the battery 34 so that the first portion of the power provided to the motor 30 from the generator 26 plus the second portion of the power provided to the motor 30 from the battery 34 equals 100% of the power required by the motor 30 to achieve the thrust output at the desired force magnitude value.

Once the threat has passed, and the signal S indicative of the threat has cleared (or if the energy stored in the battery 34 has been depleted or is nearing depletion), the controller 16 could decrease the second portion of the power and increase the first portion of the power as desired to achieve the desired force magnitude value. For example, the controller 16 could reduce the second portion of the power to as little as 0% of the power needed to achieve the desired force magnitude value and increase the flow of fuel F to the combustor 20, thereby increasing the power output of the gas turbine engine core 12 sufficiently to enable the generator 26 to provide at least 100% of the power needed by the motor 30 to achieve the thrust of the hybrid propulsion system 10 at the desired force magnitude value. Any power greater than 100% of the power needed by the motor 30 to achieve the thrust of the hybrid propulsion system 10 at the desired force magnitude value could be used to charge the battery 34 or to power another electrical load.

In the foregoing embodiment, the controller 16 could be configured to reduce the heat generated by the gas turbine engine core 12 and/or the exhaust temperature of the gas turbine engine core 12 to the greatest extent possible by reducing the first portion of the power provided to the motor 30 by the gas turbine engine core 12 and the generator 26 to the greatest extent possible, while achieving the thrust provided by the hybrid propulsion system at the desired force magnitude value.

In an embodiment, the controller 16 could be configured to vary the first portion of the power and the second portion of the power to maintain the exhaust temperature of the gas turbine engine core 12 below a predetermined threshold value as determined by an exhaust temperature sensor (not shown) providing an input to the controller 16.

In an embodiment, the sensor SEN could be a particle sensor configured to generate a signal S indicative of the sensor SEN detecting a number or mass of particles suspended in air entering an inlet of the gas turbine engine core 12 in excess of a first predetermined threshold value. The controller 16 could be configured to respond to the signal S received from the sensor SEN by reducing the rotational speed of the gas turbine engine core 12 and, more specifically, the compressor 18 of the gas turbine engine core 12, thereby causing the number of mass of particles entering the gas turbine engine core 12 to be reduced. The signal S could be generated by an operator of the aircraft manually inputting the signal due to known high particle conditions such as take off in a sandy or dusty environment.

As discussed above, such a reduction in rotational speed of the gas turbine engine core 12 may reduce the power output of the gas turbine engine core 12 and reduce the power output of the generator 26. Consequently, the first portion of power provided to the motor 30 by the generator 26 would decrease. In order to achieve the thrust output of the hybrid propulsion system 10 at the desired force magnitude value, the controller 16 would increase the second portion of the power provided to the motor by the battery 34 so that the first portion of the power provided to the motor 30 from the generator 26 plus the second portion of the power provided to the motor 30 from the battery 34 equals 100% of the power required by the motor 30 to achieve the thrust output at the desired force magnitude value.

Additionally or alternatively, the controller 16 could be configured to respond to the signal S received from the particle sensor by decreasing the fuel flow to the decreasing the flow of fuel F to the combustor 20, thereby reducing the temperature of the gas turbine engine core 12, and thereby potentially lowering the number of particles glassified in the gas turbine engine core 12. As discussed above, the reduction in fuel flow typically would yield a decrease in power output by the gas turbine engine core 12 and a decrease in the power output of the generator 26.

Consequently, the first portion of power provided to the motor 30 by the generator 26 would decrease. In order to achieve the thrust output of the hybrid propulsion system 10 at the desired force magnitude value, the controller 16 would increase the second portion of the power provided to the motor 30 by the battery 34 so that the first portion of the power provided to the motor 30 from the generator 26 plus the second portion of the power provided to the motor 30 from the battery 34 equals 100% of the power required by the motor 30 to achieve the thrust output at the desired force magnitude value.

Once the signal S has cleared, for example, because the number or mass of particles entering the inlet of the gas turbine engine core detected by the sensor SEN has fallen below a second predetermined threshold value (which may be lower than the first predetermined threshold value), the controller 16 may decrease the second portion of the power provided to the motor by the battery 34 and increase the first portion of the power provided to the motor 30 from the generator 26, as discussed above.

In an embodiment, the sensor SEN could be a geographical location sensor, for example, a global position system (GPS) unit configured to provide a signal S indicative of the geographical location of the hybrid propulsion system 10. The controller 16 could be configured to respond to the signal S by consulting a look up table or other database to determine whether noise restrictions are associated with the geographical location. If so, the controller 16 could further be configured to limit noise generated by the gas turbine engine core 12 to no greater than a predetermined threshold value by limiting at least one of the flow of fuel F to the combustor 20 and the rotational speed of the gas turbine engine, and thereby limiting the power output of the gas turbine engine core 12 and the generator 26. In the event that the resulting power output of the generator 26 is less than required by the motor 30 to achieve a desired force magnitude value, the controller 16 could respond by providing sufficient additional power from the battery 34 to the motor 30 to achieve the desired force magnitude value.

The controller 16 could be configured to receive an actual noise level from another sensor (nor shown) located proximate the hybrid propulsion system 10, for example, on an aircraft embodying the hybrid propulsion system 10, or on the ground at or near the geographical location. The geographical location may be a predetermined airport location or a predetermined zone which may include or otherwise be associated with a predetermined airport location. Alternatively, the controller 16 could be configured to calculate a theoretical noise level based on the flow of fuel F into the combustor and/or the rotational speed of the gas turbine engine core 12. The controller 16 could be configured to vary the flow of fuel F to the combustor and/or the rotational speed of the gas turbine engine core 12 so that the actual or theoretical noise level is no greater than the predetermined threshold value.

Once the signal S has cleared because the hybrid propulsion system 10 has exited a geographical location having associated noise restrictions, the controller 16 may decrease the second portion of the power provided to the motor by the battery 34 and increase the first portion of the power provided to the motor 30 from the generator 26, as discussed above.

In an embodiment, the sensor SEN could be a geographical location sensor, for example, a global position system (GPS) unit configured to provide a signal S indicative of the geographical location and altitude of the hybrid propulsion system 10. The geographical location may be a predetermined airport location or a predetermined zone which may include or otherwise be associated with a predetermined airport location. The controller 16 could be configured to respond to the signal S by reducing or limiting at least one of rotational speed of the gas turbine engine core 12 and flow of fuel F to the combustor 20 when the hybrid propulsion system 10 is at or about the geographical location and below the predetermined elevation to reduce noise emanating from the hybrid propulsion system 10 during taxi, takeoff from, and landing at the geographical location. As discussed above, each of reducing the rotational speed of the gas turbine engine core 12 and reducing the flow of fuel F to the combustor 20 may yield a decrease in power output by the gas turbine engine core 12 and a decrease in the power output of the generator 26.

Consequently, the first portion of power provided to the motor 30 by the generator 26 would decrease. In order to achieve the thrust output of the hybrid propulsion system 10 at the desired force magnitude value, the controller 16 would increase the second portion of the power provided to the motor by the battery 34 so that the first portion of the power provided to the motor 30 from the generator 26 plus the second portion of the power equals 100% provided to the motor 30 from the battery 34 equals 100% of the power required by the motor 30 to achieve the thrust output at the desired force magnitude value.

Once the signal S has cleared because the hybrid propulsion system has moved away from the geographical location or outside of the predetermined zone or has climbed above the predetermined elevation, the controller 16 the controller 16 may decrease the second portion of the power provided to the motor by the battery 34 and increase the first portion of the power provided to the motor 30 from the generator 26, as discussed above.

Figure 2A:
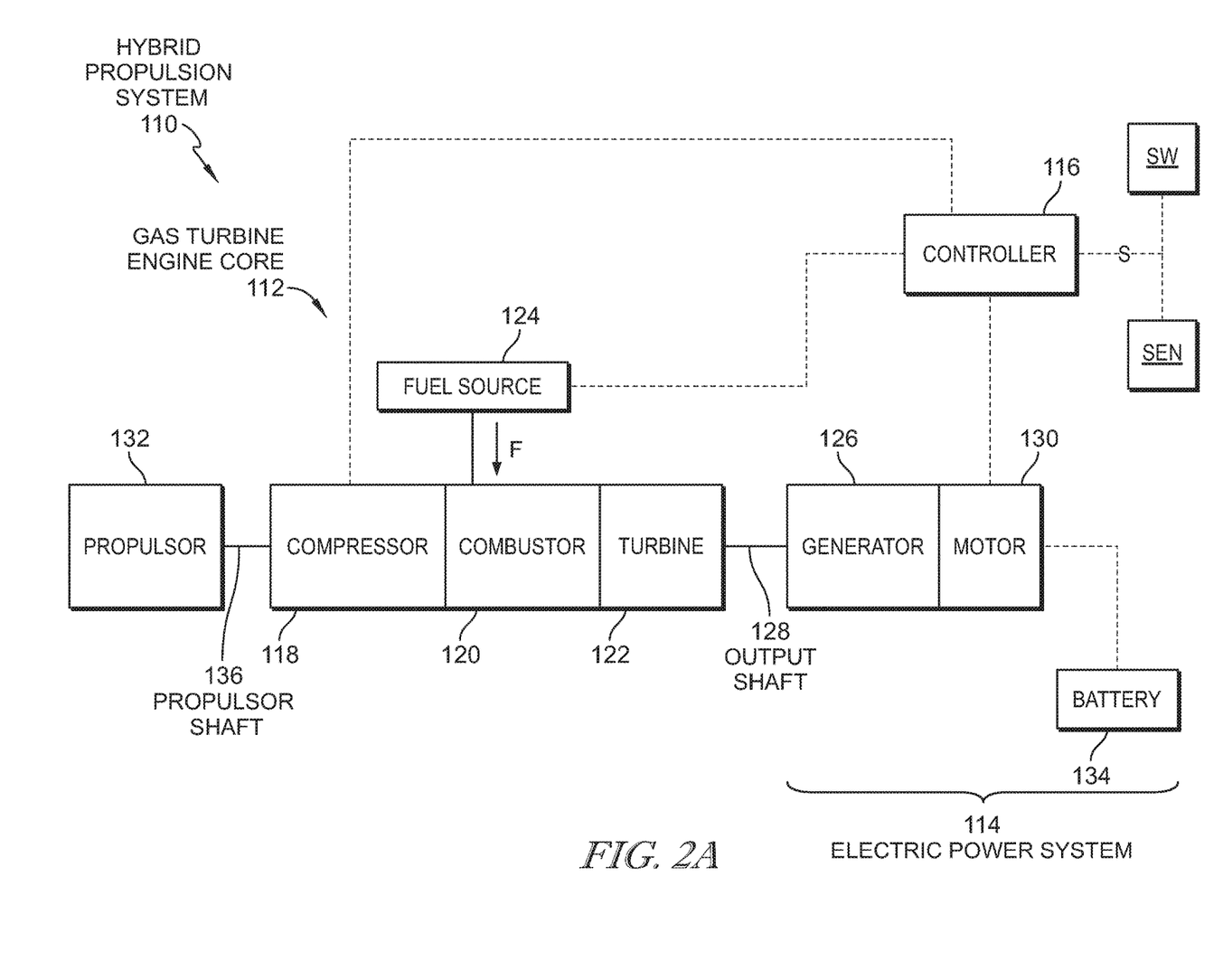
FIG. 2A is a diagrammatic view of another embodiment of a hybrid propulsion system according to the present disclosure, the hybrid propulsion system including a gas turbine engine core; a propulsor powered by the gas turbine engine core; an electric power system having a battery, a motor-generator configured to use electric energy from the battery to further power the propulsor via a turbine shaft of the gas turbine engine and to charge the battery; and a controller configured to regulate fuel provided to the gas turbine engine core and electrical energy provided to the motor-generator by the battery.
Figure 2B:
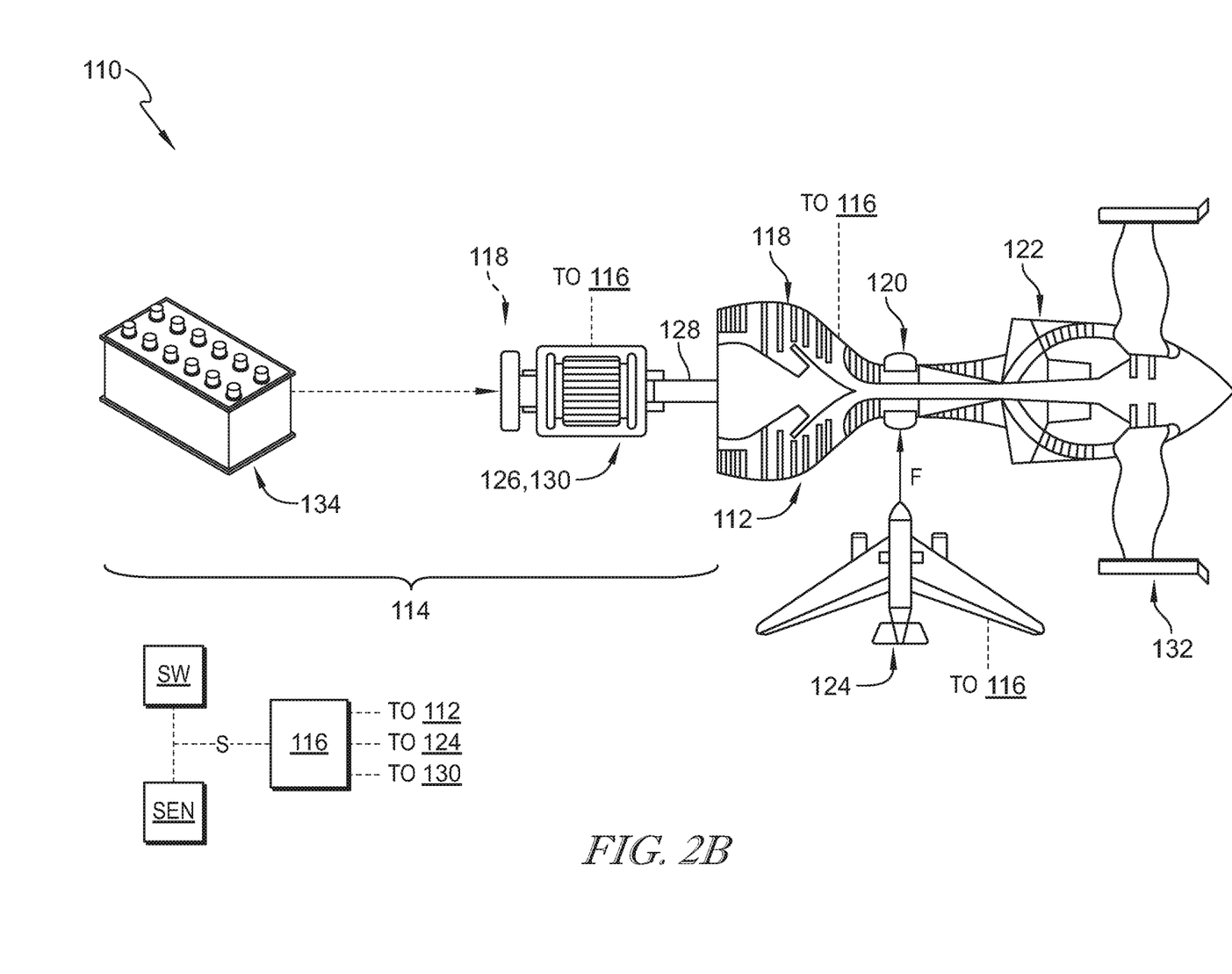
FIG. 2B is a physical illustration view of the hybrid propulsion system of FIG. 2A.

FIGS. 2A and 2B are, respectively, diagrammatic and physical illustration views of a second embodiment of a hybrid propulsion system 110 for use with an aircraft according to the present disclosure. The hybrid propulsion system 110 includes a gas turbine engine core 112, an electric power system 114, and a controller 116. The gas turbine engine core 112 includes a compressor 118, a combustor 120, and a turbine 122. The combustor 120 is configured to receive fuel F from a fuel source 124.

As shown in FIGS. 2A and 2B, the electric power system 114 includes a generator 126 operably connected to the gas turbine engine core 112 by an output shaft 128, an electric motor 130, a propulsor 133 selectively powered by the gas turbine engine core 112 and the motor 130, and a battery 134. The propulsor 133 may be, for example, a turbofan or a propeller. The propulsor 133 may be connected to the gas turbine engine core by a propulsor shaft 136. The propulsor shaft 136 may be operably connected to the output shaft 128. In an embodiment, the output shaft 128 and the propulsor shaft 136 may be the same shaft. The generator 126, motor 130, and battery 134 are operably connected to each other.

The generator 126 and motor 130 may be combined into a single unit. The operable connection between the generator 126, motor 130, and battery 134 allows the generator 126 to selectively provide power to the motor 130 to drive the motor 130 and to selectively provide power to the battery 134 to charge the battery 134. The operable connection between the generator 126, motor 130, and battery 134 also allows the battery 134 to selectively provide power to the motor 130 to drive the motor 130, and to selectively receive power from the generator 126 to charge the battery 134.

The controller 116 of FIGS. 2A and 2B may be configured to operate the hybrid propulsion system 110 thereof in a manner similar to the manner in which the controller 16 of FIGS. 1A and 1B may be configured to operate the hybrid propulsion system 10 thereof. For example, the controller 116 may be configured to vary at least one of a flow of fuel F to the combustor 120 and a rotational speed of the gas turbine engine core 112, thereby varying a first portion of power provided by the gas turbine engine core 112 to the propulsor 133 via the propulsor shaft 136, and also to the output shaft 128. The controller 116 may be configured to simultaneously vary a second portion of power provided by the motor 130 to the propulsor 133 via the propulsor shaft 136 so that the first portion of the power plus the second portion of the power equal 100% of the power required to achieve thrust output of the hybrid propulsion system 110 at a desired force magnitude value.

The controller 116 of FIGS. 2A and 2B may respond to one or more signals S as described above in connection with the controller 16 of FIGS. 1A and 1B to vary the first portion of the power and the second portion of the power provided to the propulsor 133.

Figure 3A:
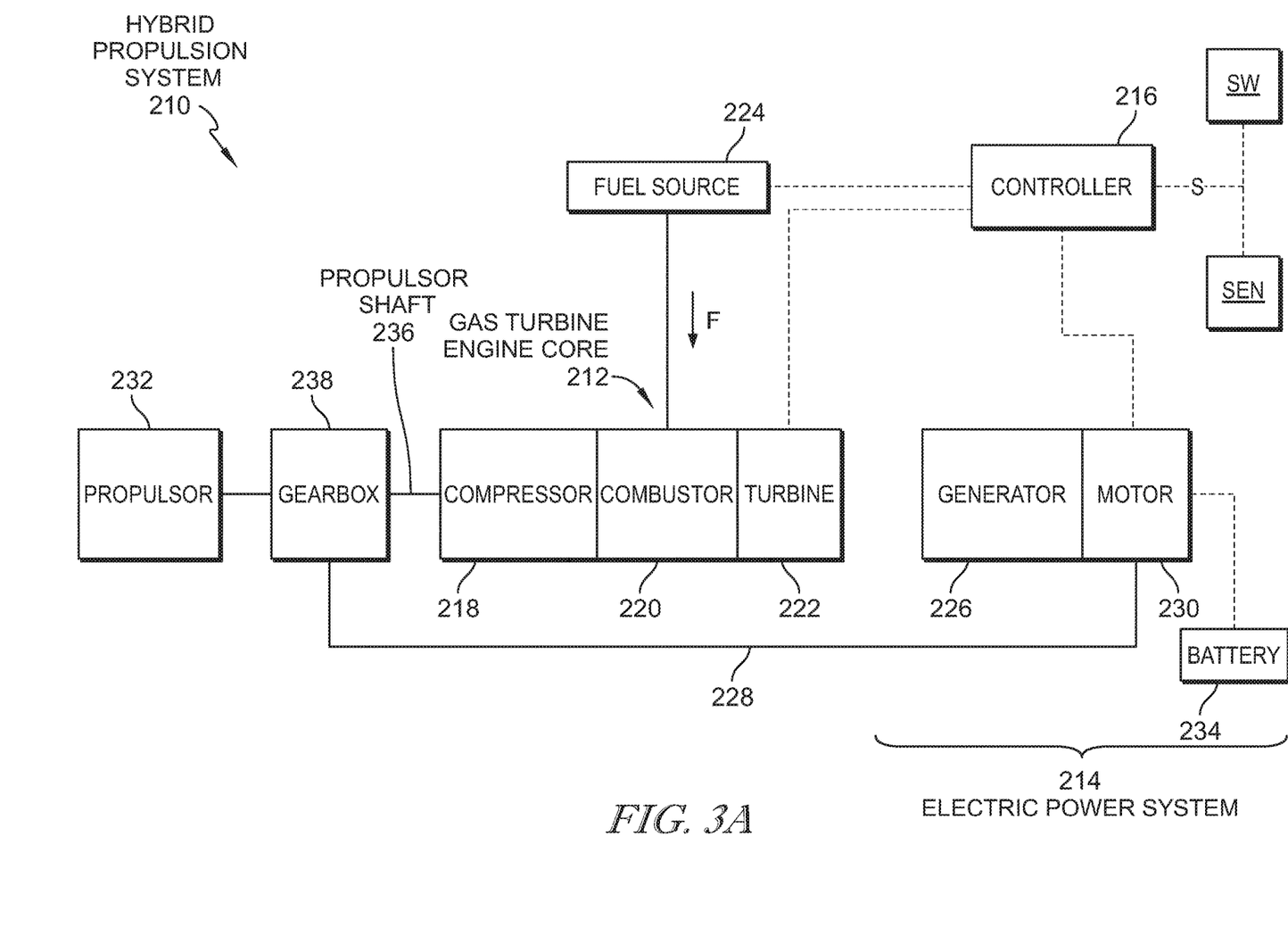
FIG. 3A is a diagrammatic view of another embodiment of a hybrid propulsion system according to the present disclosure, the hybrid propulsion system including a gas turbine engine core; a propulsor powered by the gas turbine engine core; an electric power system having a battery, a motor-generator configured to use electric energy from the battery to further power the propulsor via a gear box and to charge the battery; and a controller configured to regulate fuel provided to the gas turbine engine core and electrical energy provided to the motor by the battery.
Figure 3B:
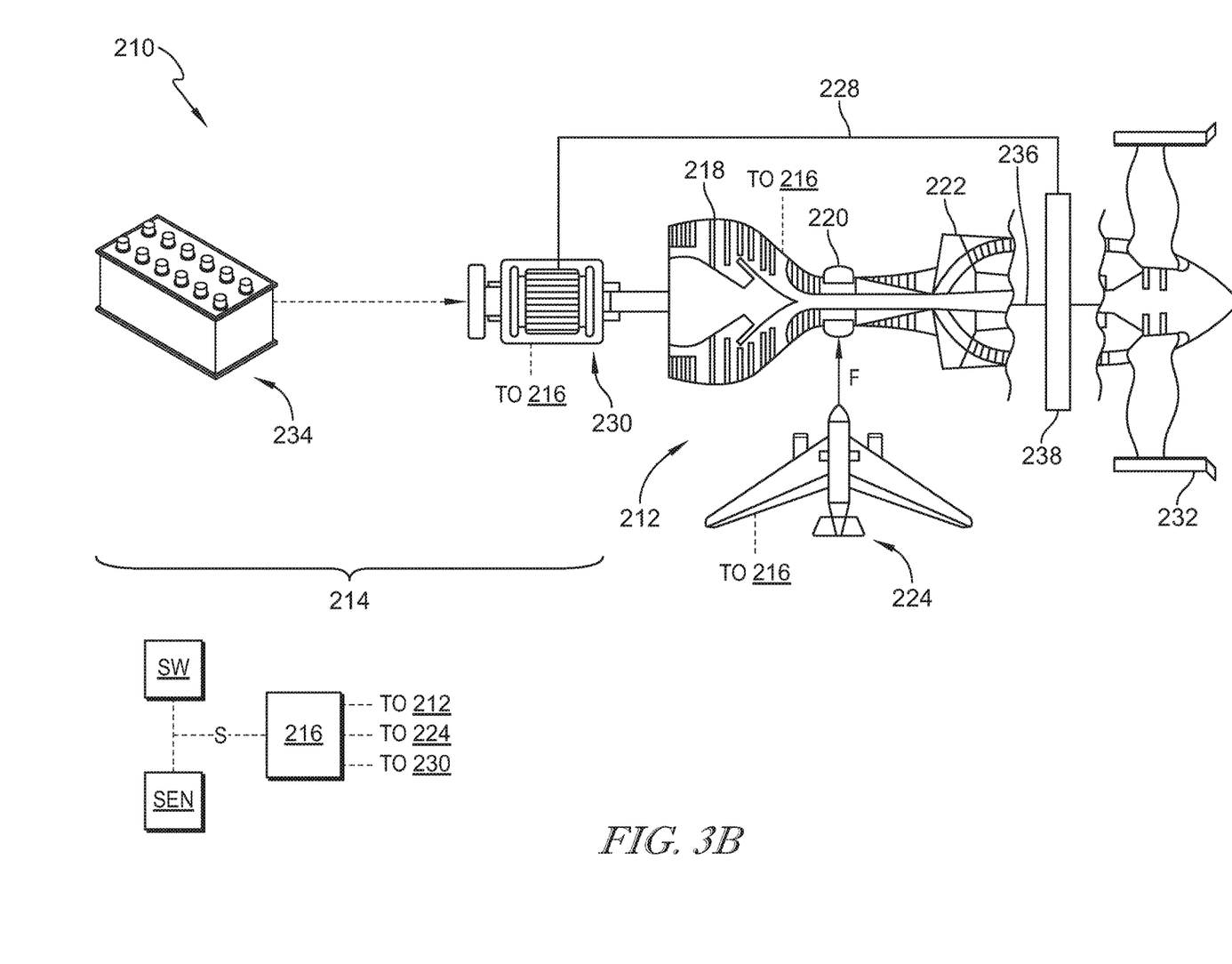
FIG. 3B is a physical illustration view of the hybrid propulsion system of FIG. 3A.

FIGS. 3A and 3B are, respectively, diagrammatic and physical illustration views of a third embodiment of a hybrid propulsion system 210 for use with an aircraft according to the present disclosure. The system 210 includes a gas turbine engine core 212, an electric power system 214, and a controller 216. The gas turbine engine core 212 includes a compressor 218, a combustor 220, and a turbine 222. The combustor 220 is configured to receive fuel F from a fuel source 224.

As shown in FIGS. 3A and 3B, the electric power system 214 includes a generator 226, an electric motor 230, a propulsor 233 selectively powered by the gas turbine engine core 212 and the motor 230, and a battery 234. The propulsor 233 may be, for example, a turbofan or a propeller. The propulsor 233 may be connected to the gas turbine engine core 12 by a propulsor shaft 236 through an intervening gearbox 238. The propulsor shaft 236 also may be operably connected to an auxiliary shaft 228 via the intervening gearbox 238. The gearbox 238 may be connected to the propulsor 233. The generator 226, motor 230, and battery 234 are operably connected to each other. The generator 226 and motor 230 may be combined into a single unit.

The operable connection between the generator 226, motor 230, and battery 234 allows the generator 226 to selectively provide power to the motor 230 to drive the motor 230 and to selectively provide power to the battery 234 to charge the battery 234. The operable connection between the generator 226, motor 230, and battery 234 also allows the battery 234 to selectively provide power to the motor 230 to drive the motor 230, and to selectively receive power from the generator 226 to charge the battery 234.

The controller 216 of FIGS. 3A and 3B may be configured to operate the hybrid propulsion system 210 thereof in a manner similar to the manner in which the controller 116 of FIGS. 2A and 2B may be configured to operate the hybrid propulsion system 110 thereof. For example, the controller 216 may be configured to vary at least one of a flow of fuel F to the combustor 220 and a rotational speed of the gas turbine engine core 212, thereby varying a first portion of power provided by the gas turbine engine core 212 to the propulsor 233 via the propulsor shaft 236. The controller 216 may be configured to simultaneously vary a second portion of power provided by the motor 230 to the propulsor 233 via the auxiliary shaft 228 and the gearbox 238 so that the first portion of the power plus the second portion of the power equal 100% of the power required to achieve thrust output of the hybrid propulsion system 210 at a desired force magnitude value.

The controller 216 of FIGS. 3A and 3B may respond to one or more signals S as described above in connection with the controller 16 of FIGS. 1A and 1B to vary the first portion of the power and the second portion of the power provided to the propulsor 233.

Figure 4A:
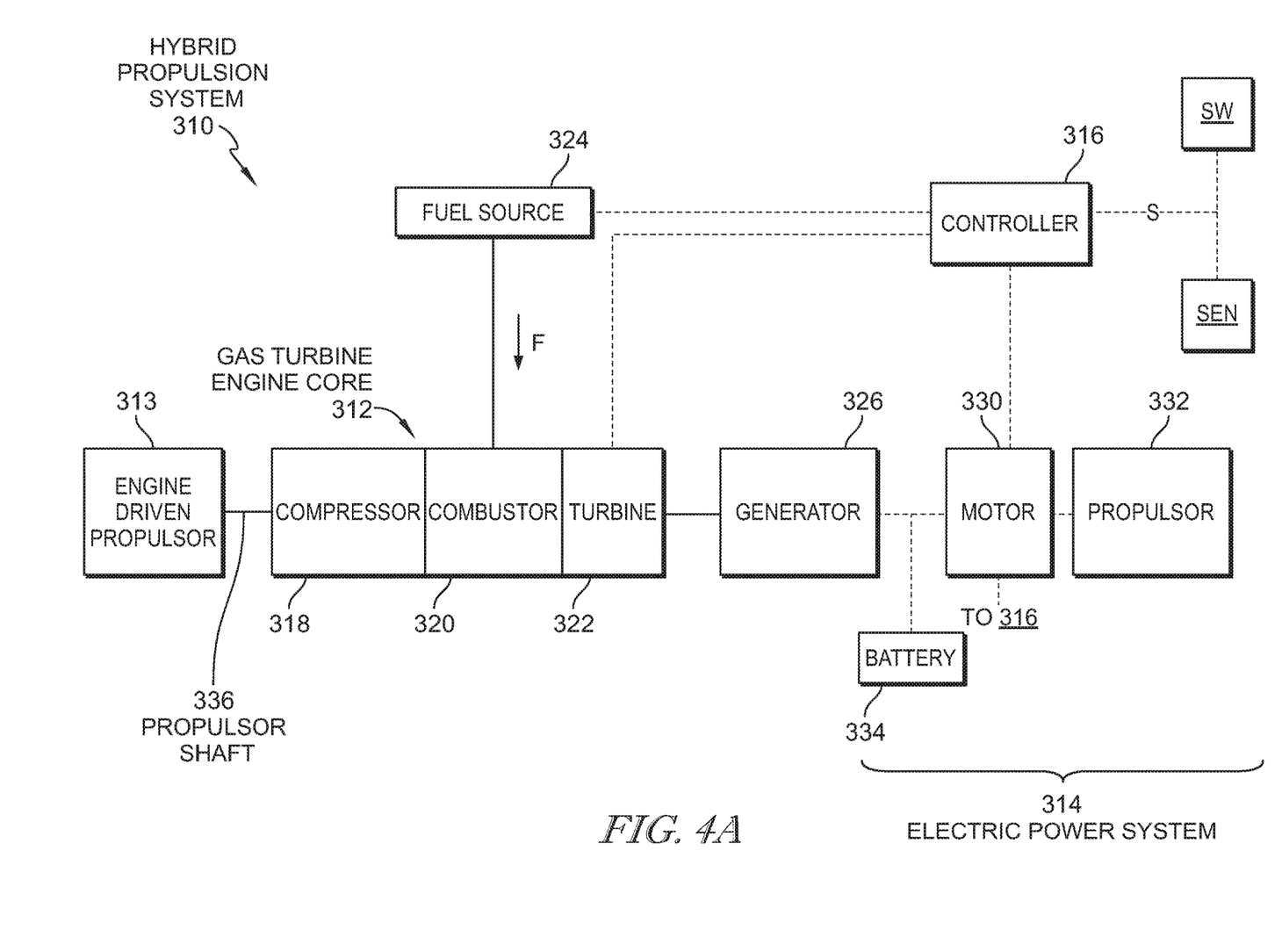
FIG. 4A is a diagrammatic view of another embodiment of a hybrid propulsion system according to the present disclosure, the hybrid propulsion system including a gas turbine engine core; a first propulsor powered by the gas turbine engine core; an electric power system having a battery, two motors powering corresponding second propulsors, a motor-generator configured to use electric energy from the battery to further power the first propulsor via a turbine shaft of the gas turbine engine, to power the motors of the second propulsors, and to charge the battery; and a controller configured to regulate fuel provided to the gas turbine engine core and electrical energy provided to the motor-generator and the motors of the second propulsors.
Figure 4B:
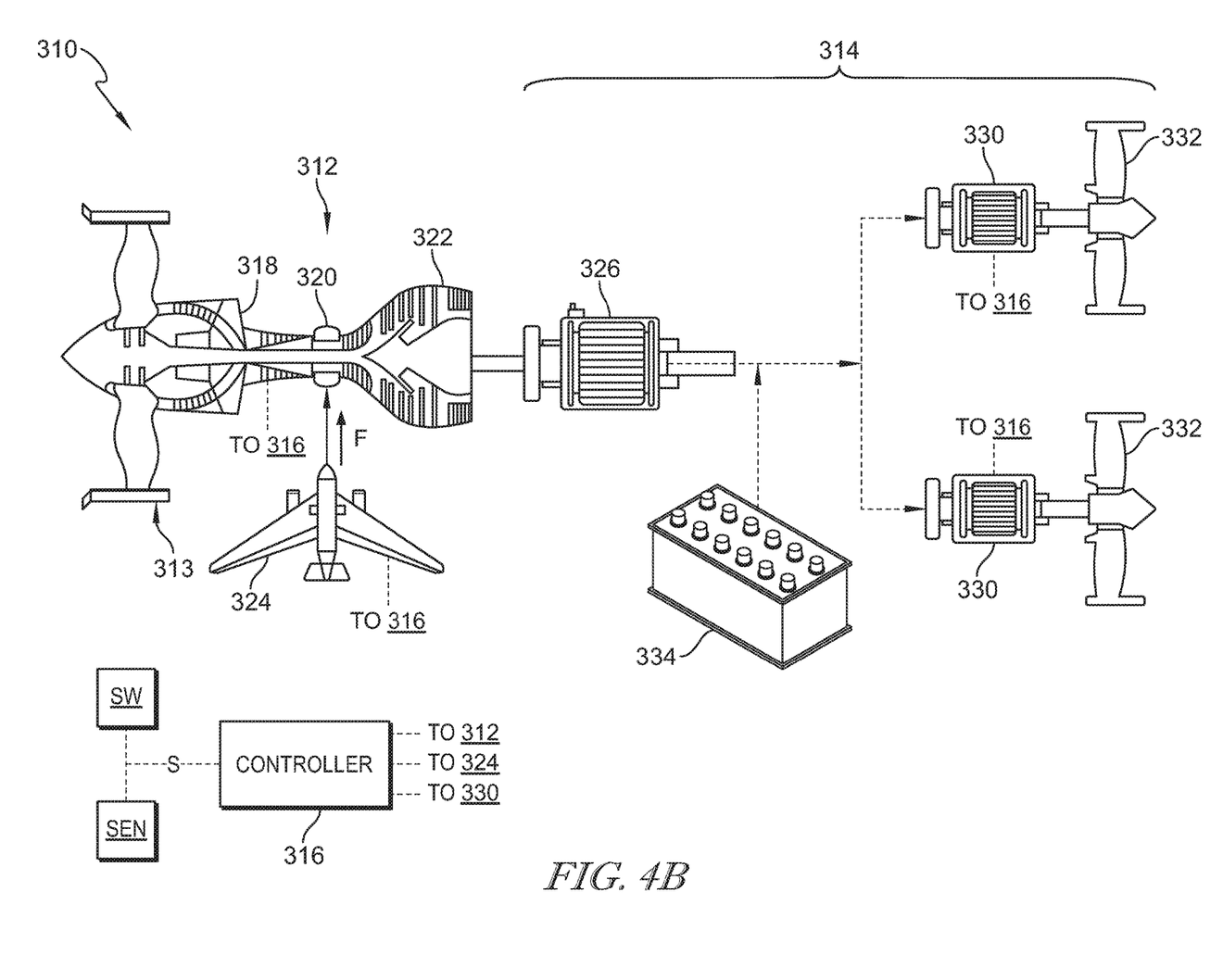
FIG. 4B is a physical illustration view of the hybrid propulsion system of FIG. 4A.

FIGS. 4A and 4B are, respectively, diagrammatic and physical illustration views of a third embodiment of a hybrid propulsion system 310 for use with an aircraft according to the present disclosure. The system 310 includes a gas turbine engine core 312, an electric power system 314, and a controller 316.

As shown in FIGS. 4A and 4B, the electric power system 314 includes a generator 326 operably connected to the gas turbine engine core 312 by an output shaft 328, an electric motor 330, a propulsor 332 powered by the motor 330, and a battery 334. The propulsor 332 may be, for example, a fan or a propeller. The generator 326, motor 330, and battery 334 are operably connected to each other.

The operable connection between the generator 326, motor 330, and battery 334 allows the generator 326 to selectively provide power to the motor 330 to drive the motor 330 and to selectively provide power to the battery 334 to charge the battery 334. The operable connection between the generator 326, motor 330, and battery 334 also allows the battery 334 to selectively provide power to the motor 330 to drive the motor 330, and to selectively receive power from the generator 326 to charge the battery 334.

As shown in FIG. 4B, the electric power system 314, the electric power system 314 may further include a second motor 330 and second propulsor 332 powered by the second motor 330. In other embodiments, the electric power system 314 could include more than two motors 330 and propulsors 332 powered by respective ones of the motors 330. References herein to the motor 330 and propulsor 332 powered by the motor 330 should be construed to apply similarly to plural motors 330 and propulsors 332 powered by respective ones of the motors 330 in embodiments having plural motors 330 and propulsors 332 powered by respective ones of the motors 330.

The hybrid propulsion system 310 also includes a gas turbine engine-driven propulsor 333 driven exclusively by the gas turbine engine core 312. The gas turbine engine-driven propulsor 333 is connected to the gas turbine engine core 312 by a propulsor shaft 336. The gas turbine engine-driven propulsor 333 may be, for example, a turbofan or a propeller.

The controller 316 of FIGS. 4A and 4B may be configured to operate the hybrid propulsion system 310 thereof in manner similar to that in which the controller 16 of FIGS. 1A and 1B may be configured to operate the hybrid propulsion system 10 thereof. For example, the controller 316 may be configured to vary at least one of a flow of fuel F to the combustor 320 and a rotational speed of the gas turbine engine core 312, thereby varying a first portion of power provided by the gas turbine engine core 312 to the gas turbine engine-driven propulsor 333 via the propulsor shaft 336 and to the generator 326 via the output shaft. The controller 316 may be configured to simultaneously vary a second portion of power provided by the motor 330 to the propulsor 332 so that the first portion of the power plus the second portion of the power equals 100% of the power required to achieve thrust output of the hybrid propulsion system 310 at a desired force magnitude value.

The controller 316 of FIGS. 4A and 4B may respond to one or more signals S as described above in connection with the controller 16 of FIGS. 1A and 1B to vary the first portion of the power provided to the gas turbine engine-driven propulsor 313 and the second portion of the power provided to the propulsor 332 riven by the motor 330.

The present disclosure relates to methods or arrangements that may reduce the size of inlet particle separator (IPS) and/or inlet barrier filter (IBF) systems on an engine. In typical embodiments, IPS or IBF systems may be large, complex, and expensive, and may also adversely affect the performance of the engine. Therefore, there are tradeoffs that may sacrifice engine power, but provide improved particle separation and ingestion prevention (i.e. sand ingestion, ice, volcanic ash, and/or other environmental debris).

As such, the present disclosure teaches an electrically augmented engine particle separator system that utilizes a hybrid propulsion system 10, 210. 310 to augment output power of the engine for core mass airfoil reduction. This may allow the size of the IPS and/or IBF hardware to be reduced, eliminated, or altered to meet austere environmental requirements.

Energy from a battery system of some sort may drive an electric motor on the engine gearbox or an embedded electronic motor to supply power to a low pressure spool. These arrangements may maintain power output allowing the core to slow down, thus reducing the airflow into the core. Reducing the airflow into the core may reduce the amount of environmental debris pulled through the core of the engine.

As a result, erosion on the compressor fan blades and seals as well as sand accretion on the turbine blades may be reduced. The reduction of erosion and sand accretion may improve the life and performance of the engine as well as safety in austere environments.

In some embodiments, the engine may remain at high power or thrust setting for takeoff and landing, while at the same time keep the core at low speeds. Similarly, such a configuration may be applicable for aircrafts at high altitude part power conditions. Such configurations may also reduce the ingestion of volcanic ash.

The hybrid propulsion system 10, 210, 310 may be implemented using several different methods. In some embodiments, the pilot of the aircraft may manually input amount of power to be provided to the motor. In other embodiments, the hybrid propulsion system 10, 210, 310 may be automatic and interface with the aircraft environmental protection systems. In such embodiments, if the pilot or automated system recognizes dangerous or poor environmental conditions, the hybrid propulsion system may activate the programed controls. In this way, the amount of particles ingested into the core of the engine may be reduced and the aircraft and crew may be kept safe.

In some embodiments, as power output or thrust increases, mass flow through the core of the engine also increases. This increase in core flow allows external environmental particles to be pulled into the flow stream thereby reducing the effectiveness or performance of the engine. By adding a conventional IPS and/or IBF system, the likelihood or engine failure in austere conditions is reduced. By further implementing the hybrid propulsion system 10, 210, 310, corrosion may be further reduced and part lifting due to erosion may be improved, while still maintaining a high power demand output.

The present disclosure also relates to methods or arrangements that may reduce the size of infrared suppression (IRS) systems. In typical embodiments. IRS systems may be large, complex, and expensive, and may also adversely affect the performance of the engine. Therefore, there are tradeoffs that may sacrifice engine power, but provide reduced infrared signature. In some embodiments, improved infrared signature capabilities may be desired, forcing more adverse power available trade-offs to be made.

As such, the present disclosure teaches the hybrid propulsion system 10, 210, 310 to augment output power of the engine for exhaust temperature heat reduction. This may allow the size of the IRS system hardware to be reduced, eliminated, or altered to meet even more stringent signature standards.

Energy from the battery system may drive an electric motor on the engine gearbox or an embedded electronic motor to supply power to the IRS system thereby reducing the amount of fuel burned by the engine. As a result, the engine exit temperatures may be reduced. In some embodiments, the engine may sit at idle power, while the electric system provides the power. Such arrangements may all but eliminate the heat signature form the aircraft.

In some embodiments, the pilot of the aircraft may manually input amount of power to be provided to the motor. In other embodiments, the hybrid propulsion system 10, 210, 310 may be automatic and interface with the aircraft defensive weapons systems. In such embodiments, if the pilot or automated system recognizes danger, the hybrid propulsion system may activate the programed controls. In this way, the heat signature of the aircraft ay be reduced and the aircraft and crew may be kept safe.

In some embodiments, as power output increases, exhaust gas temperatures also increase. As a result, a local "hot-spot" is created that may be used as a target by infrared weapons systems. By adding a conventional IRS system, the infrared targeting capabilities of a weapons system is reduced since the heat signature of the aircraft is minimized. By further implementing the hybrid propulsion system 10, 210, 310, the exhaust gas temperatures may be reduced even further, while still maintaining a high power demand output.

The present disclosure also relates to methods or arrangements that may reduce aircraft noise. Noise abatement is a compliance guideline in accordance with civil Federal Aviation Administration guidelines. Noise abatement may also be important for military specifications and operations. As such, some aircrafts may employ methods that may restrict high noise movements of the aircraft in areas of high population. Large noise levels may also telegraph the location of an aircraft, which permits quick targeting and engagement of the aircraft by others.

In some embodiments, aircrafts may sacrifice engine performance by implementing hardware either internally to the engine or externally to the airframe that may help reduce the overall noise signature of the engine. In some embodiments, noise from the engine may come from many different components, i.e. the fan, the compressor, the combustor, the turbine, the case. The noise from the engine may also come from jet velocity or interaction of the engine components with other various components of the engine.

As such, the present disclosure teaches an electrically adaptive noise abatement system that utilizes the hybrid propulsion system 10, 210, 310 to augment output power of the engine to reduce the core speed of the engine. Reducing the core speed of the engine may in turn reduce the noise form the compressor and may reduce the fuel to the combustor. As a result, other aspects of the engine noise signature may be reduced, allowing the aircraft to reduce the 65 decibel day-night average sound level contour area per Federal Aviation Administration guidelines for noise abatement. This may also allow military operations to be conducted at a reduced low noise level, minimizing possibility of detection.

Energy from a battery system of some sort may drive an electric motor on the engine gearbox or an embedded electronic motor to supply power to a low pressure spool. These arrangements may maintain power output allowing the core to slow down, thus reducing the airflow into the core. Reducing the airflow into the core may reduce the noise generated by the core as well as externally transmitted noise into the external and internal environment. In some embodiments, the engine may remain at high power or thrust settings for various stages of flight, i.e. takeoff, landing, approach, climb, loiter, and/or cruise.

In some embodiments, the pilot of the aircraft may manually input amount of power to be provided to the motor. In other embodiments, the hybrid propulsion system 10, 210, 310 may be automatic based on GPS location and/or interfaced with the aircraft defensive weapons systems. In such embodiments, if the pilot or automated system recognizes danger or noise restricted regulations, the hybrid propulsion system may activate the programed controls. In this way, the noise signature of the engine may be reduced. This noise reduction may help maintain safety of the aircraft and/or crew in military applications, or in other embodiments, mitigate exposure in noise-sensitive areas according to Federal Aviation Administration guidelines.

In some embodiments, as power output or thrust increases, mass flow through the core of the engine also increases. This increase in core flow may increase combustion, which may result in increased noise generated. By employing an electrically adaptive noise abatement system with the hybrid propulsion system 10, 110, 210, 310, thrust levels and power levels may remain, but at reduced noise levels. As a result, the possibility of detection is minimized. Such embodiments may also allow reduction of parts/components for reducing noise that may drive engine design. Further, the hybrid propulsion system may also reduce engine noise in more restrictive areas, such as densely populated areas.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A hybrid propulsion system for use with an aircraft, the hybrid propulsion system comprising:
a gas turbine engine core including a compressor, a combustor, and a turbine;
an electric power system that includes an energy storage device, a generator connected with the energy storage device, and a motor connected with the energy storage device, the motor configured to produce rotational energy in response to receiving electric energy from the energy storage device;
at least one propulsor configured to use energy received from at least one of the gas turbine engine core and the electric power system to generate thrust for propelling the aircraft; and
a controller configured to control provision of power from the gas turbine engine core and the electric power system to the at least one propulsor to cause the at least one propulsor to generate the thrust having a force magnitude value and to adjust the provision of power from the gas turbine engine core and the electric power system in response to the controller receiving a first signal so that the at least one propulsor continues to generate the thrust having the force magnitude value, wherein the first signal is generated in response to the controller detecting a threat to the aircraft indicative of a missile targeting heat generated and exhausted by the gas turbine engine core and the controller is configured to control the provision of energy by reducing a fuel flow to the gas turbine engine core while simultaneously increasing the provision of power from the electric power system to the at least one propulsor so that the heat generated and exhausted by the gas turbine engine core is reduced and the threat to the aircraft is mitigated.

2. The hybrid propulsion system of claim 1 wherein a second signal is generated in response to a manual input provided by a user of the hybrid propulsion system.

3. The hybrid propulsion system of claim 1 further comprising a particle sensor connected with the controller and located at an inlet of the gas turbine engine core and wherein a second signal is generated in response to the particle sensor detecting a number of particles suspended in air entering the inlet being greater than a predetermined threshold value.

4. The hybrid propulsion system of claim 3 wherein the controller reduces the rotational speed of the gas turbine engine core in response to receiving the second signal to cause the number of particles entering the gas turbine engine core to be reduced.

5. The hybrid propulsion system of claim 3 wherein the controller reduces the fuel flow into the gas turbine engine core in response to receiving the second signal to reduce a temperature of gases in the gas turbine engine core to lower the number of particles being glassified in the gas turbine engine core.

6. The hybrid propulsion system of claim 1 wherein the controller is configured to limit at least one of a rotational speed of the gas turbine engine core and the fuel flow into the gas turbine engine core during take-off of the aircraft, and then to increase the at least one of a rotational speed of the gas turbine engine core and the fuel flow into the gas turbine engine core during at least one of climb and cruise of the aircraft to reduce a number of particles suspended in airflow entering the gas turbine engine core during the take-off.

7. The hybrid propulsion system of claim 1 wherein a second signal is generated in response to a noise level generated by the hybrid propulsion system being above a predetermined noise threshold.

8. The hybrid propulsion system of claim 1 wherein a second signal is generated in response to an altitude of the aircraft being less than a predetermined altitude limit.

9. The hybrid propulsion system of claim 1 wherein the controller is configured to detect a geographical location of the aircraft and a second signal is generated in response to the geographical location of the aircraft the hybrid propulsion system being within a preset zone.

10. The hybrid propulsion system of claim 9 wherein the preset zone is associated with a predetermined airport location.

11. The hybrid propulsion system of claim 9 wherein the controller is configured to reduce a rotational speed of the gas turbine engine core to reduce noise generated by the hybrid propulsion system in response to receiving the second signal.

12. The hybrid propulsion system of claim 1 further comprising a sensor connected with the controller and configured to detect an exhaust temperature of the gas turbine engine core, wherein the controller is configured to generate a second signal based on data received from the sensor to control a power output of the gas turbine engine core to maintain the exhaust temperature at or below a predetermined level.

13. The hybrid propulsion system of claim 1 wherein the at least one propulsor includes at least one of a turbofan coupled directly with the gas turbine engine core, a fan located remote from the gas turbine engine core, and a propeller.

14. The hybrid propulsion system of claim 1 wherein the electric power system is coupled with the gas turbine engine core and configured to rotate the gas turbine engine core to provide power to the at least one propulsor via the gas turbine engine core.

15. A method of operating a hybrid propulsion system, comprising:
    providing a gas turbine engine core including a compressor, a combustor, and a turbine;
    providing an energy storage device;
    providing at least one propulsor configured to use energy received from at least one of the gas turbine engine core and the energy storage device to generate thrust for propelling an aircraft;
    generating a signal in response to detection of a threat to the hybrid propulsion system indicative of a missile targeting heat generated and exhausted by the gas turbine engine core; and
    varying a provision of power between the gas turbine engine core and the energy storage device to the hybrid propulsion system by reducing a fuel flow to the gas turbine engine core and increasing power from the energy storage device to the at least one propulsor in response to the signal being generated so that the at least one propulsor achieves a predetermined thrust level and the heat generated and exhausted by the gas turbine engine core is reduced and the threat of the missile to the hybrid propulsion system is mitigated.

16. The method of claim 15 wherein the signal is provided by a sensor to a controller and wherein the controller is configured to perform the step of varying the provision of power.

* * * * *